United States Patent
Liu et al.

(10) Patent No.: US 9,684,351 B2
(45) Date of Patent: Jun. 20, 2017

(54) DISCOVERY OF CONNECTIVITY BETWEEN PDU OUTLET AND DEVICE

(71) Applicant: International Business Machines Corporation, Armonk, NY (US)

(72) Inventors: Xiao Xin Liu, Beijing (CN); Manli Qi, Beijing (CN); Yu Dong Yang, Beijing (CN); Dazhao Yu, Beijing (CN); Yang Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/103,151

(22) Filed: Dec. 11, 2013

(65) Prior Publication Data

US 2014/0119742 A1     May 1, 2014

Related U.S. Application Data

(63) Continuation of application No. 14/065,694, filed on Oct. 29, 2013.

(30) Foreign Application Priority Data

Oct. 31, 2012  (CN) .......................... 2012 1 0430046

(51) Int. Cl.
  *G06Q 10/06*  (2012.01)
  *G06Q 50/06*  (2012.01)
  *G06F 1/26*  (2006.01)

(52) U.S. Cl.
  CPC .................. *G06F 1/266* (2013.01)

(58) Field of Classification Search
  CPC ....................................................... G06F 1/266
  USPC ............................................................ 398/171
  See application file for complete search history.

(56) References Cited

U.S. PATENT DOCUMENTS

| 2005/0052174 A1* | 3/2005 | Angelo ............. H01R 13/7172 324/66 |
| 2006/0097863 A1 | 5/2006 | Horowitz et al. |
| 2006/0188266 A1* | 8/2006 | Vrla ..................... H02J 7/0042 398/171 |

(Continued)

FOREIGN PATENT DOCUMENTS

| WO | 2009123586 | 10/2009 | |
| WO | WO 2009123586 A1 * | 10/2009 | ............ H04L 12/10 |

OTHER PUBLICATIONS

"U.S. Appl. No. 14/065,694 Office Action", Jul. 30, 2015, 24 pages.

(Continued)

*Primary Examiner* — David Payne
*Assistant Examiner* — Omar S Ismail
(74) *Attorney, Agent, or Firm* — DeLizio Law, PLLC

(57) ABSTRACT

Power distribution management comprises: detecting an establishment of a connection between a PDU outlet of a PDU and a device to be powered by the PDU; and causing the identification specific to the connection to be shared between the PDU and the device over optical communication in response to establishment of the connection. Corresponding system and power cable are also disclosed. According to embodiments of the present inventive subject matter, the connection relationship between any devices and PDU outlets can be determined efficiently and effectively by checking and matching the connection identifications.

6 Claims, 4 Drawing Sheets

(56) References Cited

U.S. PATENT DOCUMENTS

| | | |
|---|---|---|
| 2007/0248358 A1 | 10/2007 | Sauer |
| 2008/0025676 A1 | 1/2008 | Wang |
| 2009/0234512 A1 | 9/2009 | Ewing et al. |
| 2009/0273334 A1 | 11/2009 | Holovacs et al. |
| 2010/0189134 A1 | 7/2010 | Ying |
| 2011/0047188 A1* | 2/2011 | Martins ............ G06K 19/07749 707/803 |
| 2011/0084839 A1 | 4/2011 | Groth et al. |
| 2011/0291813 A1 | 12/2011 | Jansma |
| 2012/0117392 A1 | 5/2012 | Turicchi, Jr. et al. |
| 2014/0119741 A1 | 5/2014 | Liu et al. |

OTHER PUBLICATIONS

"U.S. Appl. No. 14/065,694 Final Office Action", Mar. 9, 2016, 25 Pages.
"U.S. Appl. No. 14/065,694 Office Action", Aug. 17, 2016, 21 pages.

\* cited by examiner

DISCOVERY OF CONNECTIVITY BETWEEN PDU OUTLET AND DEVICE

RELATED APPLICATIONS

This continuation application claims the priority of U.S. application Ser. No. 14/065,694 filed Oct. 29, 2013, which claims priority of China Application No. 201210430046.8 filed Oct. 31, 2012 in accordance with 35 U.S.C. §119.

BACKGROUND

The present invention generally relates to power distribution management, and more specifically, to a method, system, and apparatus for managing connection relationship between a power distribution unit outlet and a device.

An intelligent power distribution unit (PDU) offers enhanced power distribution and monitoring capabilities, especially for those sensitive electronic and electrical applications. The intelligent PDU is widely used to distribute power to multiple devices (for example, a server) according to a predetermined scheduling plan based on a power policy. Specifically, common intelligent PDUs at present generally have more than one outlet or socket to power multiple devices. At this point, effectively managing the PDU outlets is of importance to control and monitor the overall power distribution of the PDUs. Specifically, monitoring PDU outlets comprises: turning on and/or off any given outlet of the PDU on demand, effectively managing the power consumption of these PDU outlets, and the like. To this end, it is required to determine the connection relationship between each PDU outlet and an external device (i.e., the powered device), i.e., determine which outlet is connected to which external device.

A most simple and straightforward method for determining the connection relationship between a PDU outlet and the external device is manual operation. However, it would be appreciated that a middle-scale or large-scale data center generally has thousands of devices. Once a device is decoupled from the PDU outlet and connected to a new one, the administrator has to manually track and record this change and update information accordingly in a management system. If the administrator forgets to do so due to negligence, the management of all PDU outlets might be in a chaos, which causes potential risks of misoperation (for example, incorrectly power on/off the device). Further, it is appreciate that such solution requires remarkable labor cost.

In order to improve the PDU outlet management, some automatic or semi-automatic solutions for determining and managing connection relationship have been proposed. For example, a topologic diagram between PDU outlets and external devices can be constructed, and a candidate PDU outlet for each external device is identification using a heuristic algorithm. However, the heuristic algorithm cannot guarantee accurate determination and management of the connection relationship of each PDU outlet. For another example, it has been proposed to provide the information device with an associated RFID (radio frequency identification device) transmitter and provide the PDU outlet with a RFID reader to read the RFID of the external device connected thereto. In this way, the connection relationship between the device and the PDU outlet may be established based on the device RFID read by the outlet. A drawback of such solution is the expensive cost. It is also time-consuming and troublesome to provide a RFID transmitter and reader to the external device and PDU outlet, respectively. Moreover, those devices that have been already deployed have to be modified significantly.

SUMMARY

Embodiments of the inventive subject include a method that determines a connection identifier that uniquely identifies a first outlet and a connection of the first outlet with a device after detection of establishment of the connection between the first outlet of a plurality of outlets of a power distribution unit and the device via an electrical line and an optical line. The electrical line is for supplying power to the device. The connection identifier is stored. The connection identifier is converted from an electrical representation to an optical representation. The optical representation of the connection identifier is transmitted over the optical line.

In one aspect of the present inventive subject matter, a method for power distribution management is provided. The method comprises: detecting an establishment of a connection between a PDU outlet of a PDU and a device to be powered by the PDU; and causing identification specific to the connection to be shared between the PDU and the device over optical communication in response to the establishment of the connection.

In another aspect of the present inventive subject matter, a system for power distribution management is provided. The system comprises: a connection detecting unit configured to detect an establishment of a connection between a PDU outlet of a PDU and a device to be powered by the PDU; and an identification sharing unit configured to cause identification specific to the connection to be shared between the PDU and the device over optical communication in response to the establishment of the connection.

In a further aspect of the present inventive subject matter, a power cable for connecting a PDU outlet of a PDU and a device to be powered by the PDU is provided. The power cable comprises: a power transmission medium for transmitting electrical power generated by the PDU to the device; and an optical communication medium for transmitting identification between the PDU and the device, the identification being specific to a connection between an outlet of the PDU and the device.

In yet another aspect of the present inventive subject matter, a connector for use with the power cable described above is provided. The connector is adapted to be coupled to a PDU and comprises: an electrical signal output terminal configured to output an electrical power generated by the PDU to the electrical transmission medium for transmission; and an optical signal processing terminal configured to communicate with the optical communication medium to transmit the identification.

In still another aspect of the present inventive subject matter, a connector for use with the power cable described above is provided. The connector is adapted to be coupled to a device powered by a PDU and comprises: an electrical signal input terminal configured to transmit an electrical power transmitted via the electrical transmission medium into the device; and an optical signal processing terminal configured to communicate with the optical communication medium to transmit the identification.

The identification specific to a connection between a PDU outlet and a device may be shared between a PDU and a powered device by means of an optical communication medium. In this way, a connection relationship between any devices and PDU outlets may be determined by any third party by matching connection identifications. Moreover, according to embodiments of the present inventive subject matter, it is unnecessary to make significant modifications to the PDUs and devices that have been deployed and are currently in use. As a result, the present inventive subject matter is cost effective.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
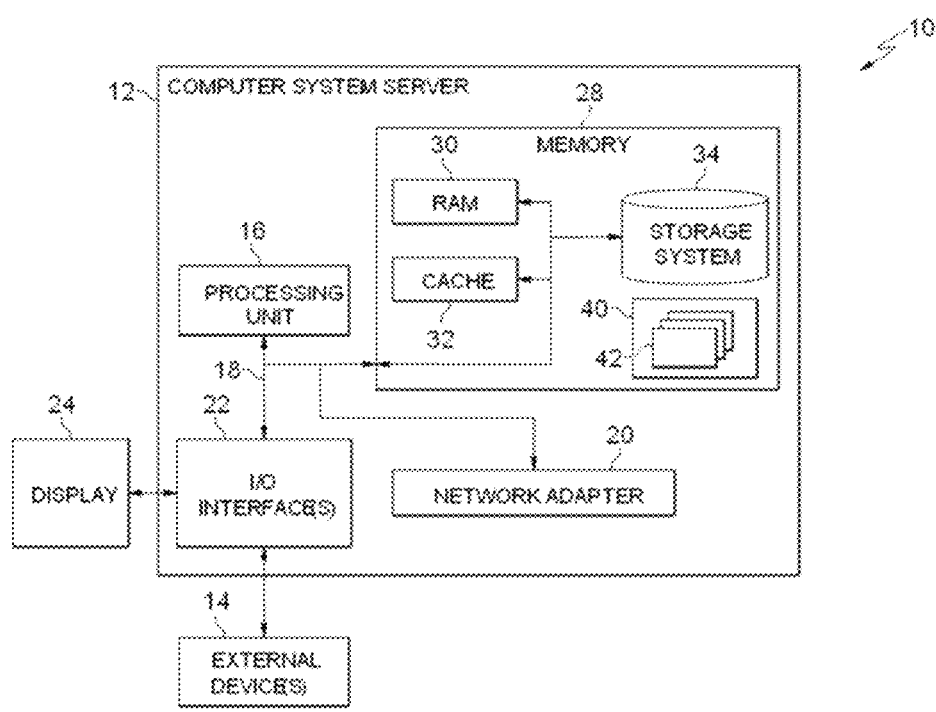
FIG. 1 illustrates an exemplary computer system 100 which is applicable to implement embodiments of the present inventive subject matter.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described below with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement embodiments of the present inventive subject matter is shown. Computer system/server 12 is only illustrative and is not intended to suggest any limitation as to the scope of use or functionality of embodiments of the inventive subject matter described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the inventive subject matter.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the inventive subject matter as described herein.

The computer system/server 12 may also communicate with one or more peripheral devices 14 (for example, a keypad, a pointing device, a display 24, etc.), and may also communicate with one or more device that enable the user to interact with the computer system/server 12, and/or communicate with any device (for example, network card, modem, etc.) that enables the computer system/server 12 to communicate with one or more other computing devices. Such communication may be performed via an input/output (I/O) interface 22. Moreover, the computer system/server 12 may also communicate with one or more networks (for example, a local area network (LAN), a wide area network (WAN), and/or a public network, for example, Internet). As shown in the figure, a network adaptor 20 communicates with other modules of the computer system/server 12 via the bus 18. It should be appreciated that although not shown in the figure, other hardware and/or software modules may be used in combination with the computer system/server 12, including, but not limited to, micro-code, device driver, redundancy processing unit, external disk driving array, RAID system, magnetic tape driver, and a data backup storage system, etc.

The flowchart and block diagrams in the Figures illustrate the architecture, functionality, and operation of possible implementations of systems, methods and computer program products according to various embodiments of the present inventive subject matter. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block in the block diagrams and/or flowcharts and a combination of blocks in block diagrams and/or flowcharts may be implemented by a dedicated hardware-based system for executing a prescribed function or operation or may be implemented by a combination of dedicated hardware and computer instructions.

Figure 2:
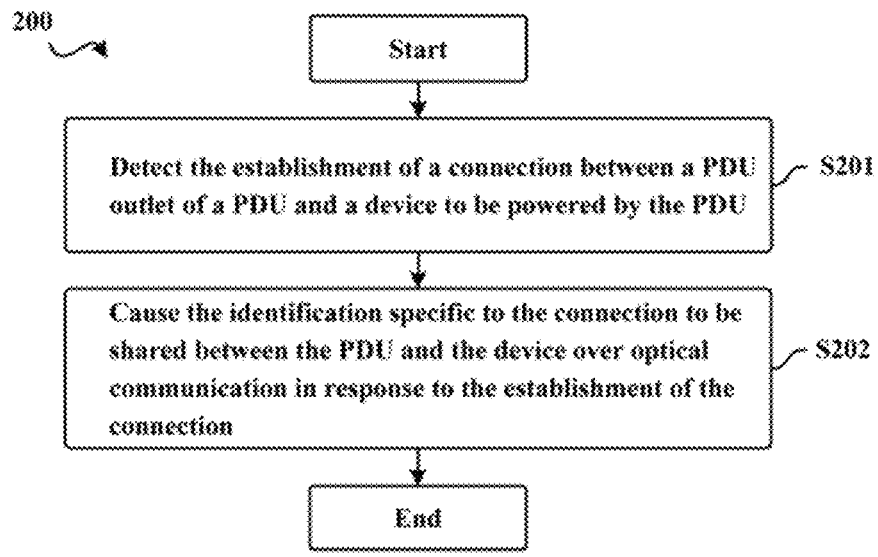
FIG. 2 illustrates a flowchart of a method 200 for power distribution management according to one exemplary embodiment of the present inventive subject matter.

Reference is now made to FIG. 2 where a flowchart of a method 200 for power distribution management according to one exemplary embodiment of the present inventive subject matter is shown.

After the method 200 starts, at step S201, the establishment of a connection between an outlet of a PDU and a device to be powered by the PDU is detected.

As used herein, the term "device" refers to any device that needs a power drive. Those skilled in the art know that a PDU outlet is a port of the PDU for connecting to a target device via a power cable and the like to supply power to the device. According to embodiments of the present inventive subject matter, when any PDU outlet on the PDU is connected to a device, the establishment of such connection may be detected in various ways.

For example, it is possible to detect that a PDU outlet has been connected to a device, for example, via a power cable or other connection medium based on mechanical, electrical or optical mechanism, or any combination thereof. For example, in the detection based on electrical property, the load states of the PDU outlets or the device connectors may be monitored using software and/or hardware at the PDU or the device, respectively, and the occurrence or increase of the load may indicate the establishment of the connection. For another example, in the detection based on mechanical property, it is possible to detect the establishment of the connection by monitoring any changes of the states such as mechanical pressure, deformations and the like which are caused by the coupling and decoupling of a mechanical connector. Moreover, the connection detection may even comprise the manual indication of the connection. It should be noted that the detection mechanisms as described here are only exemplary and should not be constructed as the limit of the present inventive subject matter. Any currently known or future developed connection detection mechanisms can be used in connection with embodiments of the present inventive subject matter.

Next, the method 200 proceeds to step S202 where identification specific to the connection between the PDU outlet and the device is shared between the PDU and the device over the optical communication.

For the sake of clarity and convenience, the identification as described here is referred to as "connection identification." The term "specific" as used herein means that the connection identification is unique for a pairing between the PDU outlet and the connected device. In other words, the PDU outlet and the device connected thereto may be uniquely identified by the connection identification.

According to embodiments of the present inventive subject matter, the "connection identification" may be the identification associated with the PDU outlet and/or the identification associated with the connected device. For example, according to some embodiments of the present inventive subject matter, each PDU outlet may have an associated identification, which is simply referred to as "PDU outlet identification." The PDU outlet identification may be any information that can uniquely distinguish and identify the PDU outlet. In other words, any two different PDU outlets of a PDU have different PDU identifications. Likewise, a unique identification associated with the connected device may be generated in any appropriate manner. Hereinafter, several specific embodiments of generating the connection identification will be detailed.

Additionally, the term "sharing" as used herein means that the connection identification is transmitted between the PDU and the device and stored by both the PDU and the device. In this way, the connection relationship between PDU outlets and devices may be easily and accurately determined by obtaining the connection identification from the device and/or PDU. Moreover, it would be appreciated from the following description that for the party that generates the connection identification (active party), "sharing" means causing the connection identification to be transmitted over the optical communication medium. In other words, from the perspective of the party that generates the connection identification, the sharing is achieved after such action is done. Correspondingly, from the perspective of a party that receives the connection identification (passive party), "sharing" means that the connection identification is received over the optical communication medium and then stored. In other words, from the perspective of the party that receives the connection identification, the sharing is achieved after such action is done.

Specifically, according to embodiments of the present inventive subject matter, at step S202, the sharing the connection identification is performed by means of optical communication. Those skilled in the art know that optical communication refers to any technique that can bear and transmit a signal with optical wave as the carrier. Currently, the most common optical communication medium comprises various types and models of optical fiber. Other currently known or future developed optical communication mediums are of course possible as well.

It is advantageous to implement sharing the connection identification between the PDU and the device over optical communication. For example, embodiments of the present inventive subject matter do not need change the existing PDUs or the connected devices as in the prior art (for example, providing them with a radio frequency transceiver). Moreover, compared with sharing the identification between the PDU and device by means of a power line communication (PLC), it is advantageous to share the connection identification over the optical communication. The PLC generally loads high frequency of bearer information to a current and then uses an adaptor for transmitting information via power line to separate the high frequency from the current and transmit the high frequency to a target device to thereby realize information transmission. Because the PLC uses the power cable as a bearer while the power cable is primarily used for electrical energy transmission instead of data transmission, its channel characteristics are not very suitable for data transmission. Additionally, due to the impacts such as the complex low-voltage grid load and load start/stop and the like, it is prone to cause strong temporal variance such as impedance and attenuation, and it is difficult to provide an accurate channel model. Further, other electrical appliances in the environment where the PDU is located, such as data center, will cause certain harmonic and interference, which might affect the performance of power line communication. By virtue of optical communication, embodiments of the present inventive subject matter can effectively eliminate the electrical interference, thereby achieving a safe and efficient communication. Moreover, embodiments of the present inventive subject matter can effectively control costs, thereby realizing a good isolation of the optical communication from a PDU power plane and a highly stable and good compatibility with the existing socket.

As above mentioned, the PDU outlet and the target device are generally connected via a power supply cable. According to some embodiments of the present inventive subject matter, the optical communication medium between the PDU outlet and the device may be independent from the cable, i.e., the power line and the optical communication line are two separate lines. Alternatively, the optical communication medium and the power line may be packaged together to physically form a single line. For example, an optical communication medium such as an optical fiber may be added into a power line (for example, a power supply cable) connecting the PDU outlet and the device. Accordingly, in the plug at the end of the power line that connects to the PDU outlet or the device, an optical output terminal may be added for transmitting optical signals. In this way, the original power transmission medium in the power line may be used to transmit the electrical power generated by the PDU to the device. In the meantime, the optical fiber may be used to transmit and share the connection identification between the PDU and the device. Such line structure can ensure the efficiency of both the power and optical transmissions in a cost effective way and is simple and easy to implement.

Based on the sharing performed at step 202, any relevant part can easily determine each device is connected to which PDU outlet by matching the connection identification. Moreover, in an environment comprising a great number of devices, such as a data center, the connection relationship between every device and the PDU outlet may be determined to construct the PDU outlet connection topographic diagram of the entire environment. In this way, effective management and monitoring of the PDU outlet and relevant devices may be realized.

The method 200 ends after step S202.

Figure 3:
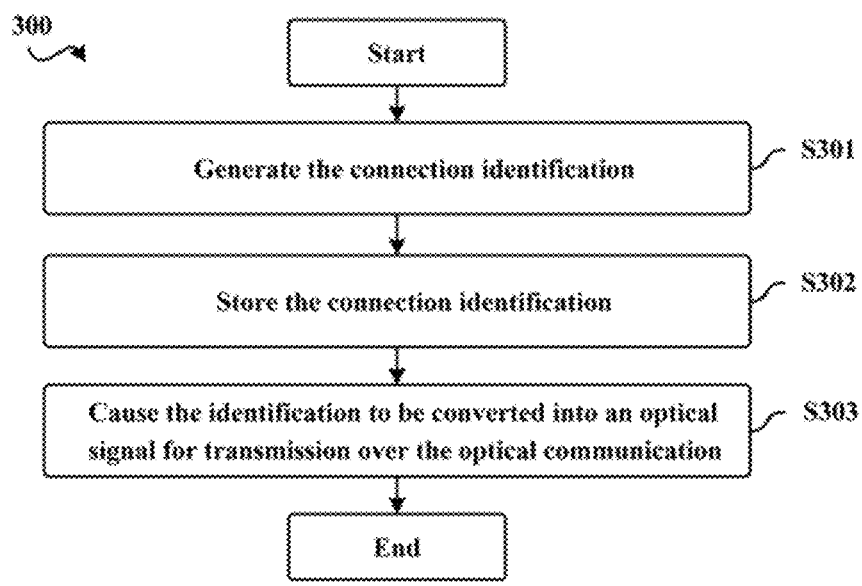
FIG. 3 illustrates a flowchart of a method 300 for power distribution management according to one exemplary embodiment of the present inventive subject matter.

Referring to FIG. 3, a flowchart of a method 300 for power distribution management according to one exemplary embodiment of the present inventive subject matter is shown. Method 300 can be understood as a particular implementation of the step S202 in the method 200. The method 300 describes a process of sharing the connection identification from the perspective of the party that generates the connection identification (or "active party"). According to embodiments of the present inventive subject matter, either the PDU or the device may serve as the active party. In other words, the instance of method 300 may be performed at the PDU side or the device side.

It should be noted that the expression "A is at B side" as used herein may indicate that A is a part or component of B, or indicate that A and B are independent from each other but A is used or controlled by B or associated therewith otherwise.

After method 300 starts, at step S301, in response to detecting the establishment of a connection between the PDU outlet and the device to be powered is established, the connection identification specific to a connection between the PDU outlet and the device is generated. As described above, the connection identification may be any information that can uniquely determine a pairing between the PDU outlet and the device.

In some exemplary embodiments, the connection identification may be the identification information associated with the PDU outlet. For example, a random number with a fixed a variable length may be generated as the PDU outlet identification, where a random number that has been generated previously will not be reused. For another example, the identification for the PDU outlet in consideration may be selected from a set of predetermined candidate identifications, and then the selected identification is then removed from the set. These are only several examples, and any alternative or additional identification generating manners are possible. Alternatively or additionally, the identification associated with the connected device may be generated in any appropriate manner to function as the connection identification. The scope of the present inventive subject matter is not limited in this regard.

Next, the method 300 proceeds to step S302 where the connection identification as generated at step S301 is stored. In this aspect, if the method 300 is executed at the PDU side, then the connection identification may be stored in any appropriate storage medium accessible to the PDU. If the method 300 is executed at the device side, then the connection identification may be stored in any appropriate storage medium accessible to the device. The term "storage medium" as used herein may include but not limited to a computer disk, a random access memory (RAM), a read-only access memory (RAM), a read-only memory (ROM), an erasable programmable read-only memory (EPROM or flash memory), an optical fiber, a portable compact disk read-only memory (CD-ROM), an optical memory device, a magnetic storage device, or any combination thereof.

Specifically, because one PDU generally has more than one PDU outlet, the mapping between each PDU outlet and the corresponding connection identification may be recorded at the PDU side using a table or any other appropriate mechanisms.

The method 300 then proceeds to step S303 to cause the electrical signal containing the connection identification to be converted into an optical signal for the sharing between the PDU and the device by means of the optical communication. It would be appreciated that the generating party of the connection identification may signal the connection identification to the receiving party. The signal may contain not only the connection identification but also any other information. Those skilled in the art would appreciate that a signal generated by a PDU or a powered electrical device are usually in a form of electrical signal. Therefore, in order to transmit the signal over the optical communication medium such as an optical fiber, the electrical signal should be converted into an optical signal before transmission.

It should be noted that as used herein, the expression "causing the electrical signal to be converted into an optical signal" may indicates that the entity executing the method 300 performs the conversion either itself or by use of another process and/or device. For example, if the entity executing the method 300 is a hardware system located at the PDU or device side, then the hardware system may include a device for converting the electrical signal into an optical signal. Alternatively, if the entity executing the method 300 is a process or program located at the PDU or device side, it may perform the electro-optical conversion by use of another device(s).

Figure 4:
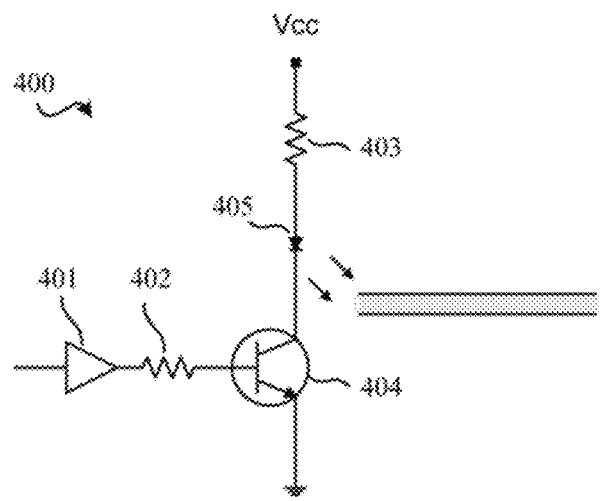
FIG. 4 illustrates a block diagram of a circuit 400 for electro-optical conversion according to one exemplary embodiment of the present inventive subject matter.

According to embodiments of the present inventive subject matter, the connection identification may be converted into an optical signal via a light emitting diode (LED). As an example, FIG. 4 shows an exemplary circuit in this aspect. As shown in FIG. 4, the circuit 400 for electro-optical conversion comprises a TTL (transistor-transistor logic) or CMOS (Complementary Metal Oxide Semiconductor) RS-232 serial output terminal 401, which is coupled to the resistor 402 that is in turn coupled to the transistor 404. The transistor 404 is coupled to the LED 405 and the ground, while the LED 405 is coupled to a power supply (Vcc) via a resistor 403. In operation, the LED 405 may convert the electric signal from the output terminal 401 into an optical signal for transmission over the optical communication medium. As described above, according to some embodiments of the present inventive subject matter, the optical communication medium may be an optical fiber which is co-located with the power transmission medium in the power cable, for example. In this event, the location of the optical fiber in the plug at the end of the power cable may be determined according to the location of the LED 405 with respect to the PDU outlet.

It should be understood that FIG. 4 is merely an example of implementing electro-optical conversion using LED, without limiting the circuit structure of such devices. Moreover, the scope of the present inventive subject matter is not limited to LED. Any device or method that can convert the electrical signal into an optical signal may be used in connection with embodiments of the present inventive subject matter. Further, as above mentioned, when the entity executing the method 300 is a hardware system, the circuit 400 may be a part of the hardware system or used by it.

When the entity executing the method 300 is a process or a program, the circuit 400 may be used or called by the process or program.

Returning to FIG. 3, as described above, from the perspective of the transmitting party, the sharing is achieved after the connection identification is sent out over the optical communication medium at step S303. Accordingly, the method 300 ends after step S303.

Figure 5:
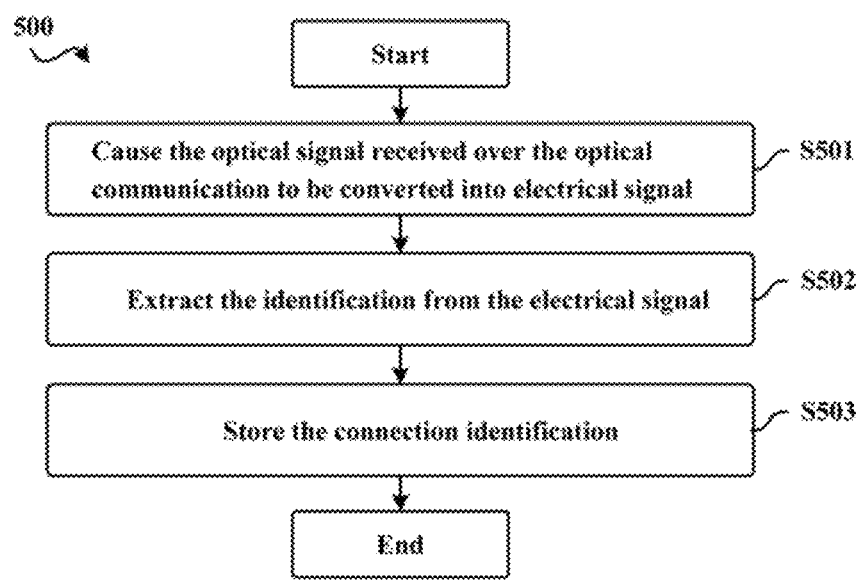
FIG. 5 illustrates a flowchart of a method 500 for power distribution management according to one exemplary embodiment of the present inventive subject matter.

Now refer to FIG. 5, a flowchart of a method 500 for power distribution management according to one exemplary embodiment of the present inventive subject matter is shown. The method 500 can be understood as a particular implementation of the step S202 in the method 200. The method 500 describes the sharing of the connection identification from the perspective of the party that receives the connection identification (or "passive party"). According to embodiments of the present inventive subject matter, either the PDU or the device may serve as the passive party.

After the method 500 starts, at step S501, the optical signal received over optical communication is caused to be converted into an electrical signal. According to embodiments of the present inventive subject matter, when the method 500 is executed at the PDU side, the method 300 described above is executed at the device side connected to the PDU. At this point, the optical signal is transmitted from the device to the PDU. When the method 500 is executed at the device side connected to the PDU, the method 300 described above is executed at the PDU side. At this point, the optical signal is transmitted from the PDU to the device. After the optical signal is received over the optical communication transmission, the receiving party (i.e., the passive party) may cause the optical signal to be converted into the electrical signal.

Similar to the above mentioned, the expression "causing the optical signal to be converted into an electrical signal" as used herein may indicate that the entity executing the method 500 performs the conversion either itself or by use of another process and/or device. Specifically, if the entity executing the method 500 is a hardware system located at the PDU or device side, then the hardware system may include a device for converting the optical signal into an electrical signal. Alternatively, if the entity executing the method 500 is a process or program located at the PDU or device side, the process or program may perform the conversion by use of another device(s).

Figure 6:
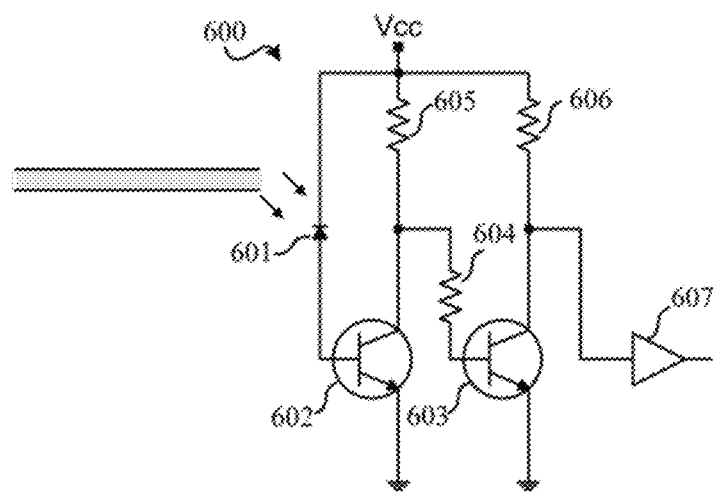
FIG. 6 illustrates a block diagram of a circuit 600 for electro-optical conversion according to one exemplary embodiment of the present inventive subject matter.

According to embodiments of the present inventive subject matter, the optical signal may be converted into an electrical signal via at least one of a photo diode and a photo transistor. FIG. 6 shows a block diagram of an exemplary circuit 600 in this aspect. As shown, the circuit 600 for optical-electrical conversion may comprise a photodiode 601, transistors 602, 603, resistors 604, 605, and 606, and an output terminal 607. The photodiode 601 is coupled to the power supply Vcc and the transistor 602. The transistor 602 is grounded, coupled to the power supply Vcc via the resistor 605, and coupled to the transistor 603 via the resistor 604. The transistor 603 is grounded, coupled to the power supply Vcc via the resistor 606, and coupled to the output terminal 607. The optical signal received over the optical communication medium (for example, optical fiber) is passed to the photodiode 601, and the output terminal 607 may output the converted electrical signal.

It should be understood that FIG. 6 is merely an example of implementing optical-electrical conversion using a photodiode, without limiting the circuit structure of such devices. The photo transistor may also be used to implement such electrical-optical conversion, which is known to those skilled in the art. In fact, any device or method capable of converting an optical signal into an electrical signal may be applied in connection with embodiments of the present inventive subject matter. Again, as described above, when the entity executing the method 500 is a hardware system, the circuit 600 may be a part of the hardware system or used by it. When the entity executing the method 500 is a process or a program, the circuit 600 may be used or called by the process or program.

Returning to FIG. 5, the method 500 then proceeds to step S502, where the identification specific to a connection between the PDU outlet and the device (i.e., the connection identification) is extracted from the electrical signal. As described above, the electrical signal that is generated by the transmitting party includes the connection identification. Accordingly, the connection identification generated by the transmitting party may be extracted from a converted electrical signal at step S502.

Next, at step 503, the connection identification extracted from step S502 is stored. In this aspect, if the method 500 is executed at the PDU side, then the connection identification may be stored in any appropriate storage medium accessible to the PDU. On the contrary, if the method 500 is executed at the device side powered by the PDU, then the connection identification may be stored in any appropriate storage medium accessible to the device. The term "storage medium" used here may include, but not limited to a computer disk, a random access memory (RAM), a read-only access memory (RAM), a read-only memory (ROM), an erasable programmable read-only memory (EPROM or flash memory), an optical fiber, a portable compact disk read-only memory (CD-ROM), an optical memory device, a magnetic storage device, or any combination thereof.

As described above, from the perspective of the receiving party, after the connection identification is received over the optical communication medium at step S503 and then stored s, the sharing is achieved. Accordingly, the method 500 ends after step S503.

Examples of methods for power distribution management according to some embodiments of the present inventive subject matter have been described with reference to FIGS. 3 and 5. According to embodiments of the present inventive subject matter, when a device is connected to a PDU outlet, one party (active party) in the PDU and the device may execute the method 300 to generate, store and transmit the connection identification to the other party (passive party) over the optical communication. Correspondingly, the passive party may receive and store the connection identification. In this way, any third party (for example, an administrator or a management system) may verify whether the connection identifications held by the device and the PDU match to easily determine the connection between a device and a PDU outlet and/or establish the PDU outlet connection topology.

Specifically, as described above, either the PDU or the device may function as the active party, while the other one functions as the passive party. In other words, when a device is connected to a PDU outlet, the identification specific to the connection may be generated either at the PDU side or at the device side. The scope of the present inventive subject matter is not limited in this regard.

Figure 7:
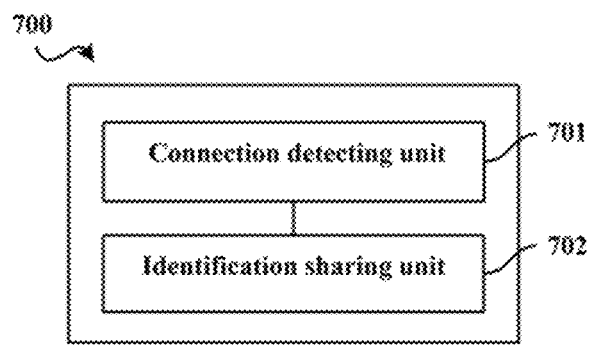
FIG. 7 illustrates a block diagram of a system 700 for power distribution management according to one exemplary embodiment of the present inventive subject matter.

Reference is now made to FIG. 7, where a block diagram of a system 700 for power distribution management according to embodiments of the present inventive subject matter is shown. As shown, the system 700 comprises: a connection detecting unit 701 configured to detect an establishment of a connection between a PDU outlet of a PDU and a device to be powered by the PDU; and an identification sharing unit 702 configured to cause identification specific to the connection to be shared between the PDU and the device over optical communication in response to the establishment of the connection.

According to some embodiments of the present inventive subject matter, the connection detecting unit 701 may comprise at least one of the following: a mechanical connection detecting unit configured to detect the establishment of the connection using a mechanical property; an optical connection detecting unit configured to detect the establishment of the connection using an optical property; and an electrical connection detecting unit configured to detect the establishment of the connection using an electrical property. According to some embodiments of the present inventive subject matter, the electrical connection detecting unit may comprise a load monitoring unit configured to detect the establishment of the connection by monitoring the load at the PDU outlet.

According to some embodiments of the present inventive subject matter, the identification sharing unit 702 may comprise: an identification generating unit configured to generate the identification specific to the connection; a first identification storing unit configured to store the identification specific to the connection; an electro-optical converting unit configured to cause an electrical signal including the identification specific to the connection to be converted into an optical signal for transmission over the optical communication.

According to some embodiments of the present inventive subject matter, the identification sharing unit 702 may comprise: an optical-electro converting unit configured to cause the optical signal received over the optical communication to be converted into an electrical signal; an identification extracting unit configured to extract the identification specific to the connection from the electrical signal; and a second identification storing unit configured to store the identification specific to the connection.

According to some embodiments of the present inventive subject matter, the identification sharing unit 702 may comprise: an optical communication unit configured to cause the identification specific to the connection to be shared over an optical fiber in a power cable that connects the PDU outlet and the device.

For the sake of clarity, FIG. 7 does not show optional units or sub-units comprised in the system 700. It should be understood that various units or sub-units comprised in system 700 correspond to corresponding steps of the methods 300 and 500 as described with reference to FIG. 3 and FIG. 5, respectively. Thus, all the features and operations described above with respect to the methods 300 and 500 are applicable to the system 700, which will not be detailed here.

Moreover, the partitioning of the units or subunits in system 700 is just exemplary and for the purpose of describing the functions or operations logically. The functions of a single unit as shown in FIG. 7 may be implemented by multiple units. On the contrary, the multiple units as illustrated in FIG. 7 may also be implemented by a single unit. The scope of the present inventive subject matter is not limited thereto.

Specifically, the units comprised in the system 700 may be implemented in various manners, comprising software, hardware, firmware, or any combination thereof. For example, according to some embodiments of the present inventive subject matter, various units of the system 700 may be implemented using software and/or firmware modules. At this point, as above mentioned, these software units may implement optical-electrical conversion or electrical-optical conversion by calling another module(s) or device(s). Alternatively or additionally, the units of the system 700 may also be implemented using hardware. For example, various units of the system 700 may be implemented as an integrated circuit (IC) chip, an application specific integrated circuit (ASIC), a field programmable gate array (FPGA), a system on chip (SOC), etc. Other manners that are currently known or developed in the future are also feasible, and the scope of the present inventive subject matter is not limited thereto.

Furthermore, according to some embodiments, there is provided a power cable for connecting a PDU outlet of a PDU and a device to be powered by the PDU. The power cable comprises: a power transmission medium for transmitting electrical power generated by the PDU to the device; and an optical communication medium for transmitting identification between the PDU and the device, the identification being specific to a connection between an outlet of the PDU and the device. In some embodiments, the optical communication medium comprises an optical fiber.

According to embodiments of the present inventive subject matter, there is provided a connector for use with the power cable as described above. The connector is adapted to be coupled to a power distribution unit PDU and comprises: an electrical signal output terminal configured to output an electrical power generated by the PDU to the electrical transmission medium so as to transmit the electrical power; and an optical signal processing terminal configured to communicate with the optical communication medium to transmit the identification.

In addition, according to embodiments of the present inventive subject matter, there is provided a connector for use with the power cable as described above. The connector is adapted to be coupled to a device powered by a power distribution unit PDU comprises: an electrical signal input terminal configured to input an electrical power transmitted via the electrical transmission medium into the device; and an optical signal processing terminal configured to communicate with the optical communication medium to transmit the identification.

Those skilled in the art would appreciate that the "transmission/transmitting" may indicate outputting an optical signal representing the identification to the optical communication medium. Or, alternatively, it may indicate receiving the optical signal representing the identification from the optical communication medium. The optical signal processing terminal may have the output function, the receiving function, or both the output and receiving functions and work in a duplex mode or semi-duplex mode.

The descriptions of the various embodiments of the present inventive subject matter have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   detecting, using a connection detecting unit of a power distribution unit (PDU), an establishment of a connection between a first power outlet of a plurality of power outlets the PDU and a power supply cable for supplying power to a device, wherein the power supply cable comprises at least an electrical line for conveying the power, an optical communication medium, and a plug for connecting the power supply cable to the first power outlet;

generating, in response to the establishment of the connection, a connection identifier via an identification generating unit, the connection identifier for uniquely identifying the first power outlet and the connection;

storing, via an identification storing unit, the connection identifier;

converting, via an electro-optical converting unit, the connection identifier from an electrical representation to an optical signal;

causing transmission of the optical signal representing the connection identifier using a light emitting diode (LED) at the first power outlet coupled to the optical communication medium at the plug.

2. The method of claim 1, further comprising:
receiving a received optical signal associated with a different connection identifier; and
storing the different connection identifier.

3. The method of claim 1, wherein said generating the connection identifier comprises generating a random number that has not been utilized for another of the plurality of power outlets.

4. The method of claim 1, wherein said generating the connection identifier comprises selecting the connection identifier from a plurality of predefined connection identifiers.

5. The method of claim 4, further comprising indicating the selected connection identifier as no longer available.

6. The method of claim 1, further comprising updating a power distribution unit outlet connection topographic diagram to indicate the connection between the first power outlet and the device.

* * * * *